(12) United States Patent
Ma et al.

(10) Patent No.: US 12,006,068 B2
(45) Date of Patent: Jun. 11, 2024

(54) SPACE LAUNCH SYSTEM AND METHOD THROUGH ELECTROMAGNETIC PUSHING

(71) Applicant: Naval University of Engineering, Wuhan (CN)

(72) Inventors: Weiming Ma, Wuhan (CN); Yuxing Zhang, Wuhan (CN); Mingyuan Zhang, Wuhan (CN); Xiangming Zhang, Wuhan (CN); Weichao Li, Wuhan (CN); Xinlin Long, Wuhan (CN); Chen Deng, Wuhan (CN)

(73) Assignee: NAVAL UNIVERSITY OF ENGINEERING, Wuhan (CN)

( * ) Notice: Subject to any disclaimer, the term of this patent is extended or adjusted under 35 U.S.C. 154(b) by 226 days.

(21) Appl. No.: 17/580,727

(22) Filed: Jan. 21, 2022

(65) Prior Publication Data

US 2022/0144456 A1    May 12, 2022

Related U.S. Application Data

(63) Continuation-in-part of application No. PCT/CN2020/086022, filed on Apr. 22, 2020.

(30) Foreign Application Priority Data

Jul. 24, 2019  (CN) .......................... 201910671431.3

(51) Int. Cl.
*H02P 1/54* (2006.01)
*B64G 1/00* (2006.01)
*H02N 11/00* (2006.01)
*B60L 50/13* (2019.01)
*F02K 9/74* (2006.01)

(52) U.S. Cl.
CPC .......... *B64G 1/002* (2013.01); *H02N 11/006* (2013.01); *B60L 50/13* (2019.02); *F02K 9/74* (2013.01)

(58) Field of Classification Search
CPC ........ H02P 6/006; H02P 21/22; B64G 1/002; B60L 50/13; F02K 9/74; H02N 11/006
See application file for complete search history.

(56) References Cited

FOREIGN PATENT DOCUMENTS

| CN | 107539493 A | * | 1/2018 | ................ B64F 1/04 |
| CN | 106921280 B | * | 1/2019 | |
| CN | 209776831 U | * | 12/2019 | |

* cited by examiner

*Primary Examiner* — Karen Masih
(74) *Attorney, Agent, or Firm* — MATTHIAS SCHOLL P.C.; Matthias Scholl (57) ABSTRACT

A space launch system and method through electromagnetic pushing. The space launch system comprises an energy storage subsystem, an energy conversion subsystem, a linear motor subsystem, and a control maintenance subsystem. The space launch system converts the electric energy into an electromagnetic force. Through the electromagnetic force, a rocket is pushed to be accelerated to a certain speed along an electromagnetic launching track to realize the launching of the rocket.

17 Claims, 6 Drawing Sheets

SPACE LAUNCH SYSTEM AND METHOD THROUGH ELECTROMAGNETIC PUSHING

CROSS-REFERENCE TO RELATED APPLICATIONS

This application is a continuation-in-part of International Patent Application No. PCT/CN2020/086022 with an international filing date of Apr. 22, 2020, designating the United States, now pending, and further claims foreign priority benefits to Chinese Patent Application No. 201910671431.3 filed Jul. 24, 2019. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to the field of space launch systems for pushing objects by electromagnetic force, and more particularly to a space launch system and a method through electromagnetic pushing.

Since the Soviet Union launched the world's first man-made earth satellite in 1957, all the satellite launches have adopted the manner of launching the satellite to the required space orbit merely by the rocket thrust, which comes from the wake flow injected when burning chemical fuels. This traditional satellite launch manner has the following disadvantages: first, the rocket needs to be ignited on a rocket launch pad, and the launch pad needs to be maintained after the launch, resulting in long rocket launch preparation and maintenance time and difficulty in realizing high-frequency rapid launches. Second, with the continuous progress of electronic information technology, the cost of satellites is getting lower and lower, but the cost of rocket launches has remained high for a long time. Third, the traditional rocket launch manner aims at large load and high orbit, and the satellites carried can only adapt to the launching conditions, so there are limited launching opportunities and serious lack of launching flexibility.

SUMMARY

An objective of the disclosure is to provide a space launch system and method through electromagnetic pushing. The electromagnetic launch system solves the three major problems in the traditional rocket launch: first, the inability of satisfying high-frequency continual launches; second, the inability of the cost of the single-time rocket launch lower than that of the traditional rocket launch by about one order of magnitude; and third, limited launching opportunities and serious lack of launching flexibility in the traditional satellite launch.

Specifically, the disclosure provides an aerospace launch system through electromagnetic pushing, the system comprising:

an energy storage subsystem, configured to deliver stored energy to an energy conversion subsystem during rocket propulsion;

the energy conversion subsystem, configured to convert the energy delivered by the energy storage subsystem into AC electric energy and output the AC electric energy to a linear motor subsystem;

the linear motor subsystem, configured to receive the AC electric energy output by the energy conversion subsystem and generate an electromagnetic force that pushes a rocket to be accelerated to a certain speed within a certain distance; and a control maintenance subsystem, configured to send different control instructions respectively to the energy storage subsystem, the energy conversion subsystem and the linear motor subsystem and control the energy storage subsystem, the energy conversion subsystem and the linear motor subsystem to run according to predetermined programs.

In a class of this embodiment, the energy storage subsystem is further configured to absorb energy from a power supply system and store the energy during the interval of rocket propulsion.

In a class of this embodiment, the energy storage subsystem comprises n×m mutually independent power modules, wherein n is a number of linear motors, and m is a number of phases of each of the linear motors.

In a class of this embodiment, each of the power modules is divided into p power units, and each of the power units is connected to a corresponding inverter unit in an inverter in the energy conversion subsystem.

In a class of this embodiment, each of the power units comprises a battery pack array and a charging cabinet, and the charging cabinet is a charging interface connected between the power supply system and the battery pack array.

In a class of this embodiment, each of the power units further comprises an energy storage switch cabinet, and the energy storage switch cabinet is connected between the battery pack array and the inverter unit.

In a class of this embodiment, the energy conversion subsystem comprises n×m mutually independent inverters, each of the inverters supplies power to one phase of one linear motor, n is a number of linear motors, and m is a number of phases of each of the linear motors.

In a class of this embodiment, each of the inverters comprises k inverter cabinets connected in parallel, and each of the inverter cabinets comprises p inverter units connected in cascade connection.

In a class of this embodiment, the linear motor subsystem comprises n linear motors and a rocket adapter, each of the linear motors comprises a stator and a rotor mounted on the stator, and the rocket adapter is connected to the rotors of the n linear motors.

In a class of this embodiment, the stators of the n linear motors are uniformly arranged along a circumferential direction of the rocket adapter.

In a class of this embodiment, the stators of then linear motors are uniformly arranged along a radial direction of the rocket adapter, and n is an even number.

In a class of this embodiment, an angle between the stator of each of the linear motors and the horizontal plane is 0-90 degrees.

In a class of this embodiment, the stator of each of the linear motors adopts a sectional power supply manner.

In a class of this embodiment, the control maintenance subsystem comprises a top-level control facility, an energy storage control facility, an energy conversion control facility and a linear motor control facility, wherein the top-level control facility, the energy storage control facility, the energy conversion control facility and the linear motor control facility are connected through a control ring.

The top-level control facility is configured to provide a human-computer interaction control interface and send control instructions respectively to the energy storage control facility, the energy conversion control facility and the linear motor control facility.

The energy storage control facility is configured to implement charging and discharging control on the energy storage subsystem according to the received control instruction.

The energy conversion control facility is configured to implement energy conversion control on the energy conversion subsystem according to the received control instruction.

The linear motor control facility is configured to implement real-time control on the rotor motion and control on the sectional power supply of the stators of the linear motors in the linear motor subsystem according to the received control instruction.

In a class of this embodiment, the control maintenance subsystem further comprises an energy storage monitoring facility, an energy conversion monitoring facility, a linear motor monitoring facility and a management and maintenance facility, wherein the energy storage monitoring facility, the energy conversion monitoring facility, the linear motor monitoring facility and the management and maintenance facility are connected with each other through a health ring.

The energy storage monitoring facility is configured to collect operational data of the energy storage subsystem and upload the operational data to the management and maintenance facility.

The energy conversion monitoring facility is configured to collect operational data of the energy conversion subsystem and upload the operational data to the management and maintenance facility.

The linear motor monitoring facility is configured to collect operational data of the linear motor subsystem and upload the operational data to the management and maintenance facility.

The management and maintenance facility is configured to analyze, display, store and query the health status and information of the energy storage subsystem, the energy conversion subsystem and the linear motor subsystem according to the received data, and provide a maintenance test function.

Provided is an aerospace launch method through electromagnetic pushing. The method comprises: electric energy is converted into an electromagnetic force, and through the electromagnetic force, a rocket is pushed to be accelerated to a certain speed along an electromagnetic launching track to realize the launching of the rocket.

In a class of this embodiment, DC electric energy is converted into AC electric energy that is supplied to linear motors, the electric energy is converted into an electromagnetic force by the linear motors, and the rocket is pushed through the electromagnetic force.

In a class of this embodiment, a plurality of linear motors pushes the rocket through a rocket adapter.

In a class of this embodiment, the electric energy is converted into the electromagnetic force through a linear motor subsystem, the linear motor subsystem comprises n linear motors and a rocket adapter, each of the linear motors comprises a stator and a rotor mounted on the stator, the stators of the n linear motors form the electromagnetic launching track, the rocket adapter is connected to the rotors of the n linear motors, the rocket is mounted on the rocket adapter, and the stators of the n linear motors are symmetrically arranged along a circumferential direction of the rocket adapter; or the stators of the n linear motors are symmetrically arranged along a radial direction of the rocket adapter, and n is an even number.

In a class of this embodiment, an angle between the stator of each of the linear motors and the horizontal plane is 0-90 degrees.

The disclosure has the following beneficial effects:

(1) Due to the adoption of a cold launch manner in which the electromagnetic force is generated by the electromagnetic launch system to push the rocket, that is, the rocket is not ignited before leaving the launch pad but ignited after being launched into the upper air, zero damage to the launch pad can be achieved, and the recovery time of the launch pad is shortened to hundreds of seconds. Even considering the transfer time of the launch load, the interval between continual launches can be shortened to less than 1 hour, and the objective of multiple rocket launches within one launch window time frame can be achieved, so that high-frequency continual rocket launches are achieved.

(2) Since the rocket is accelerated to several Mach number in advance before being ignited through the electromagnetic launch system, compared with the traditional rocket, the rocket eliminates a first-stage part, which greatly saves the rocket fuel, reduces the rocket weight, simplifies the rocket structure and greatly lowers the rocket cost.

(3) When the electromagnetic launch system is adopted to launch the satellites, since the electromagnetic force of the linear motor is continuously adjustable, different sizes of rockets can be used according to the actual needs of the satellites to adapt to wider requirements for launch time and tracks, so that the launch manner is flexible and convenient.

(4) Due to the adoption of the redundancy design, the entire electromagnetic launch system has redundancy capability, which ensures the completion of the current launch task when part of facilities fail, so that the risk of rocket launch failures is greatly reduced when the electromagnetic launch system fails, thereby solving the problem in reliability.

DETAILED DESCRIPTION OF THE EMBODIMENTS

Specific embodiments of the disclosure will be further described below in combination with the accompanying drawings. It should be noted that the description of the embodiments is used to help understand the disclosure, but does not constitute a limitation to the disclosure. Further, the technical features involved in the various embodiments of the disclosure described below may be combined with each other as long as they do not conflict with each other.

Figure 1:
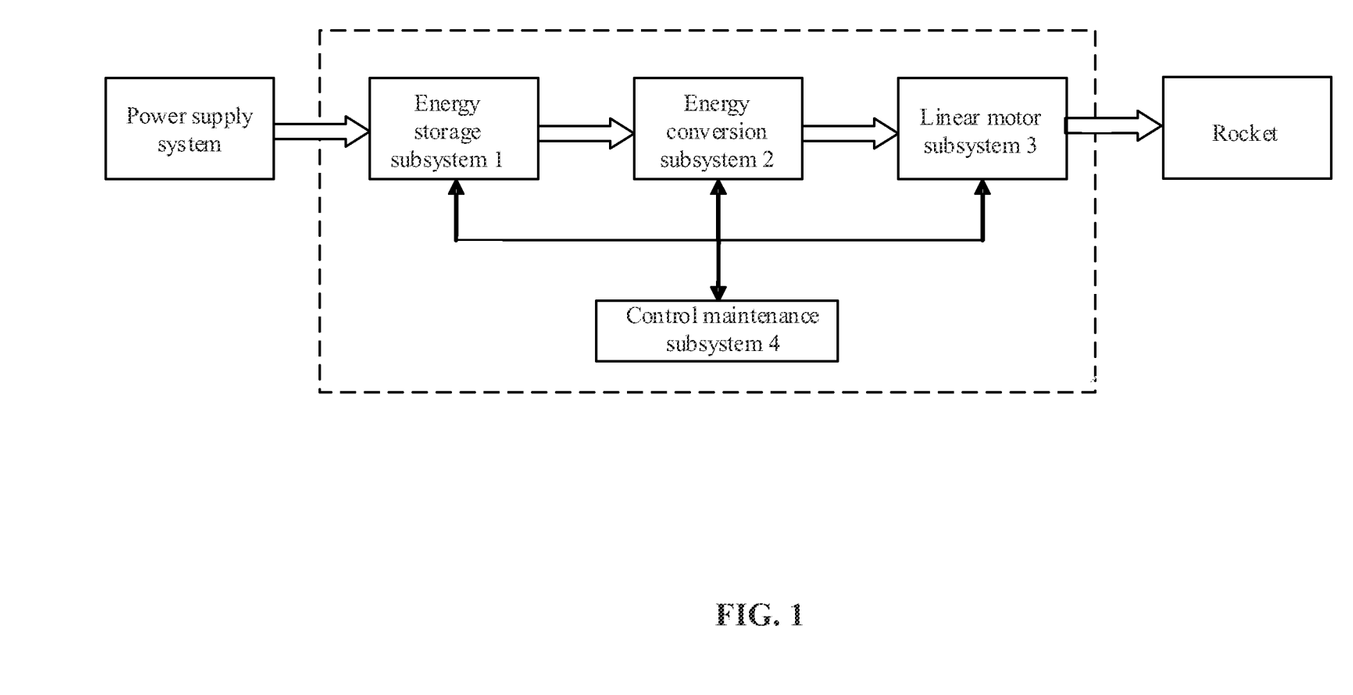
FIG. 1 is a principle diagram according to the disclosure.

As shown in FIG. 1, the disclosure provides a space launch system through electromagnetic pushing, comprising an energy storage subsystem 1, an energy conversion subsystem 2, a linear motor subsystem 3 and a control maintenance subsystem 4, between which an energy flow and an information flow are mainly present in the relationship. The energy flow is as follows: before each launch, a power supply system supplies electric energy to an energy storage subsystem 1, and the energy storage subsystem 1 stores the electric energy, during the launch, the energy storage subsystem 1 supplies the electric energy to an energy conversion subsystem 2, and the energy conversion subsystem 2 modulates the electric energy and supplies the modulated electric energy to a linear motor subsystem 3. The information flow is as follows: a control maintenance subsystem 4 is connected to the other three major subsystems through redundant distributed industrial Ethernet, so that devices for the energy flow are controlled to run according to predetermined programs, and the health status of the other three major subsystems and the control maintenance subsystem itself can be diagnosed in real time. The functions of the subsystems are as follows:

The energy storage subsystem 1 is configured to absorb energy from the power supply system and store the energy for a long time during the interval of rocket propulsion according to a control instruction, and also configured to deliver the stored energy to the energy conversion subsystem 2 according to a received control instruction during rocket propulsion.

The energy conversion subsystem 2 is configured to convert the energy delivered by the energy storage subsystem 1 into required frequency-modulated voltage-modulated AC electric energy and output the AC electric energy to the linear motor subsystem 3 according to a control instruction.

The linear motor subsystem 3 is configured to receive the AC electric energy output by the energy conversion subsystem 2 and generate an electromagnetic force that pushes the rocket to be accelerated to a set speed within a certain distance according to a control instruction.

The control maintenance subsystem 4 is configured to send different control instructions respectively to the energy storage subsystem 1, the energy conversion subsystem 2 and the linear motor subsystem 3 and control the energy storage subsystem 1, the energy conversion subsystem 2 and the linear motor subsystem 3 to run according to the predetermined programs. The control maintenance subsystem 4 is connected to the other three subsystems through a network, and is mainly configured to provide a human-computer interface between operators and system devices, control the subsystems to complete operations according to predetermined procedures, and monitor and manage the status of facilities of the subsystems.

Figure 2:
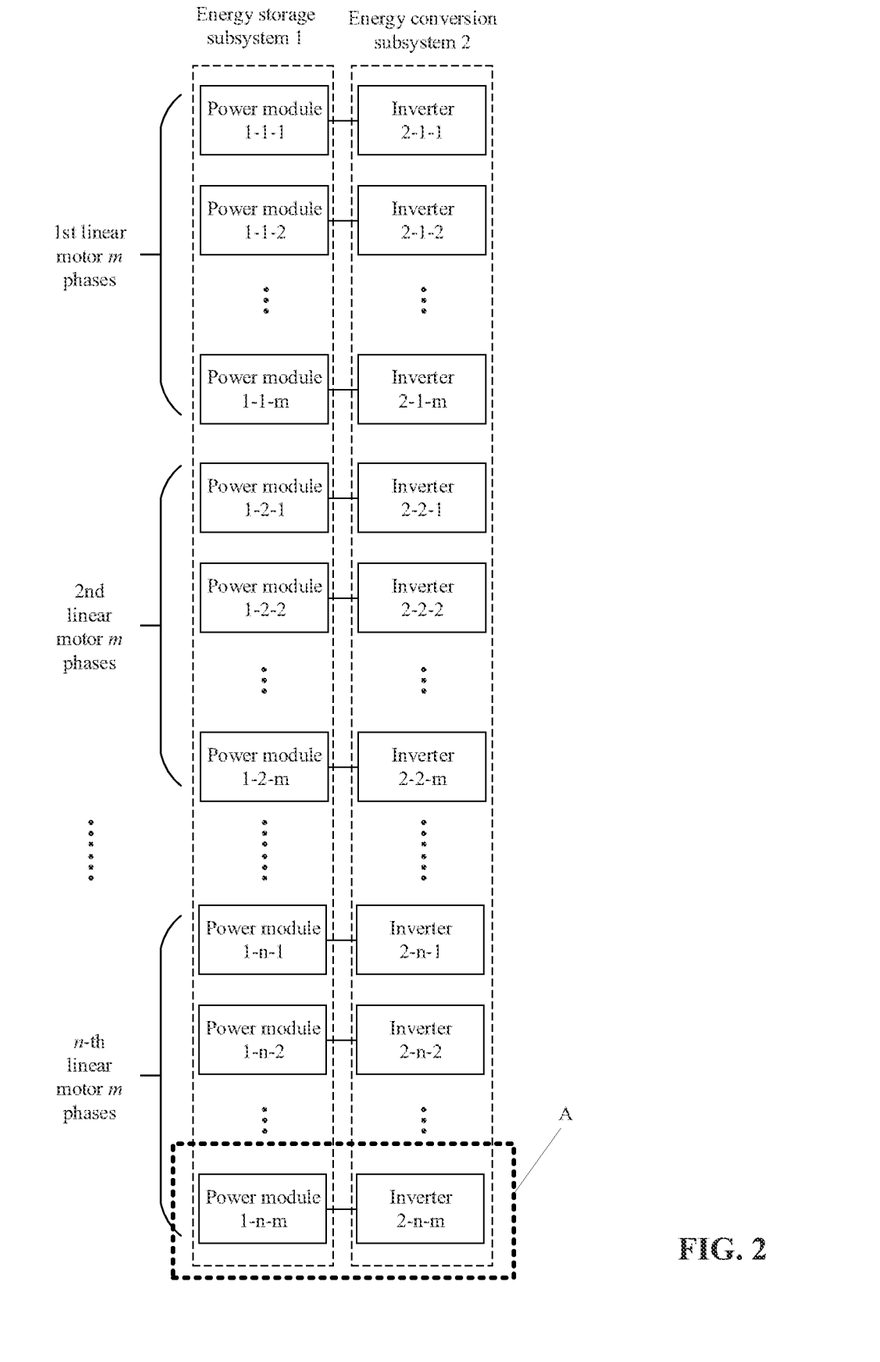
FIG. 2 is a schematic diagram of an energy storage subsystem and an energy conversion subsystem according to the disclosure.
Figure 3:
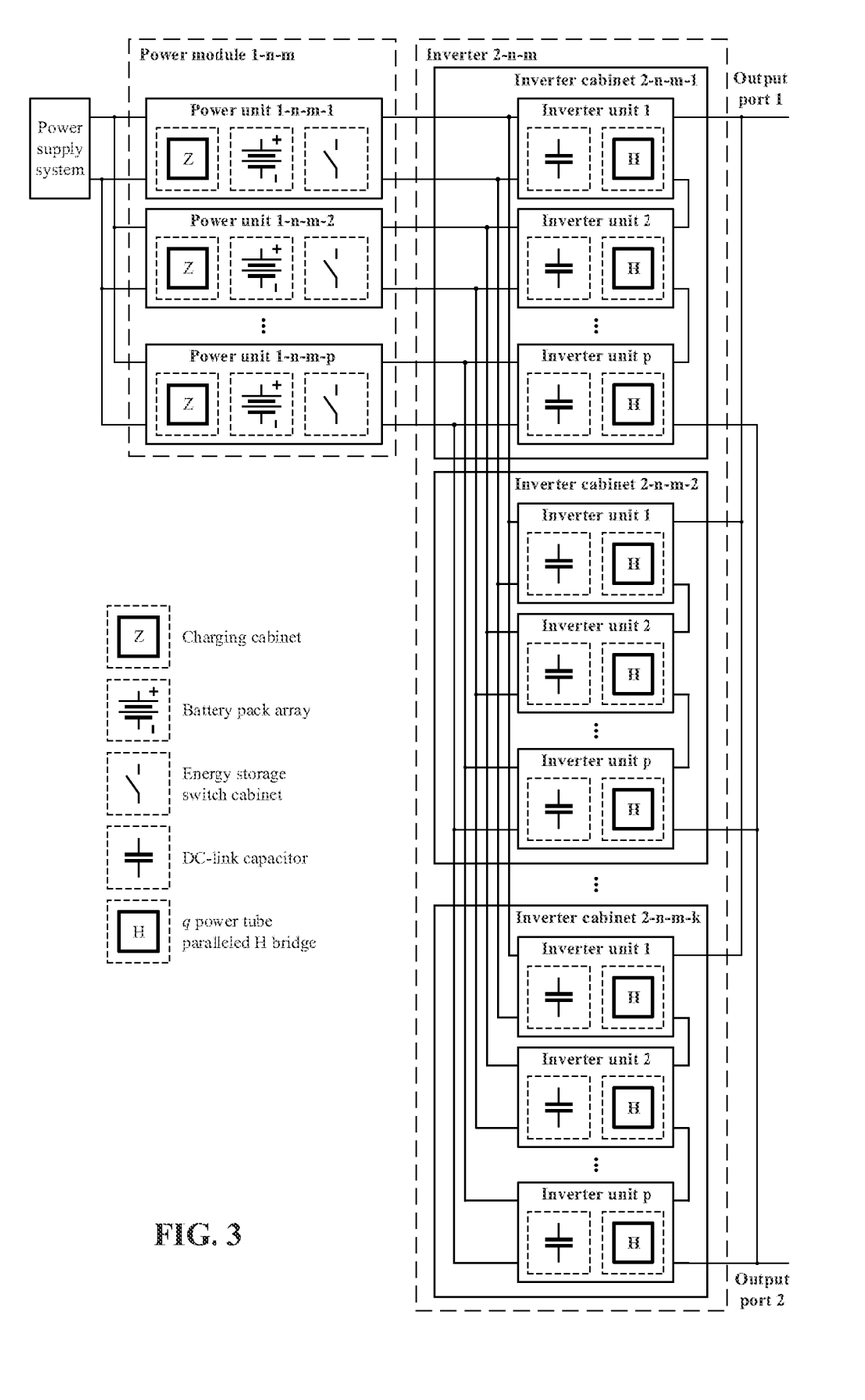
FIG. 3 is a schematic diagram of a single power module and a single inverter in box A in FIG. 2.

In the above solution, as shown in FIG. 2 and FIG. 3, the energy storage subsystem 1 adopts a solution of high-safety large-discharge-rate lithium batteries for an energy storage element, specifically comprising n×m mutually independent power modules, wherein n is a number of linear motors, m is a number of phases of each of the linear motors, and n and m are respectively an integer greater than or equal to 1. Each of the power modules independently supplies power to one phase of one linear motor. Each of the power modules is divided into p power units, each of the power units is respectively connected to a plurality of corresponding inverter units (that is, corresponding inverter units connected in parallel in k inverter cabinets below) in an inverter in the energy conversion subsystem, and p is an integer greater than or equal to 1. Each of power units comprises: a battery pack array, a charging cabinet and an energy storage switch cabinet. The battery pack array comprises a plurality of lithium batteries connected in series and in parallel. The charging cabinet is a charging interface connected between the power network and the battery pack array. The energy storage switch cabinet is connected between the battery pack array and the inverter unit. At the interval of rocket propulsion, the power supply system charges the energy storage subsystem with low power through the charging cabinet. During the rocket propulsion, the energy storage subsystem supplies high-power electric energy to the linear motors through the energy conversion subsystem.

In the above solution, as shown in FIG. 2 and FIG. 3, the energy conversion subsystem 2 adopts a solution of centralized inverter arrangement, specifically comprising n×m mutually independent inverters, wherein n is a number of linear motors, m is a number of phases of each of the linear motors, and each of the inverters supplies power to one phase of one linear motor. Each of the inverters comprises k inverter cabinets connected in parallel, and each of the inverter cabinets comprises p inverter units in cascade connection, that is, the corresponding inverter units in the k inverter cabinets at a DC side are connected in parallel. After the inverter units in a single inverter cabinet at an AC side are in cascade connection, an output end is then connected with an output end of the other inverter cabinets in parallel. For example, at the DC side (that is, an input end), the first inverter unit of the 1st inverter cabinet, the first inverter unit of the second inverter cabinet, . . . , and the first inverter unit of the k-th inverter cabinet are connected in parallel, . . . , and the p-th inverter unit of the 1st inverter cabinet, the p-th inverter unit of the second inverter cabinet, . . . , and the p-th inverter unit of the k-th inverter cabinet are connected in parallel. At the AC side (that is, the output end), the first inverter unit, . . . , and the p-th inverter unit of the 1st inverter cabinet are in cascade connection, . . . , the first inverter unit, . . . , and the p-th inverter unit of the k-th inverter cabinet are in cascade connection, and the output end of the 1st inverter cabinet, . . . , and the output end of the k-th inverter cabinet are connected in parallel. A single inverter unit is of an H-bridge structure formed by q power tubes connected in parallel, and n, m, k, p and q are integers greater than or equal to 1. Since the capacity of the energy conversion subsystem is at the gigavolt-ampere level and the single-tube performance of the current power electronic device is limited, the energy conversion subsystem can only be realized by cascade connection plus parallel connection. An exemplary power device of the disclosure is an IGBT, but a topology solution shown in FIG. 3 is also applicable to other types of power devices.

Figure 4:
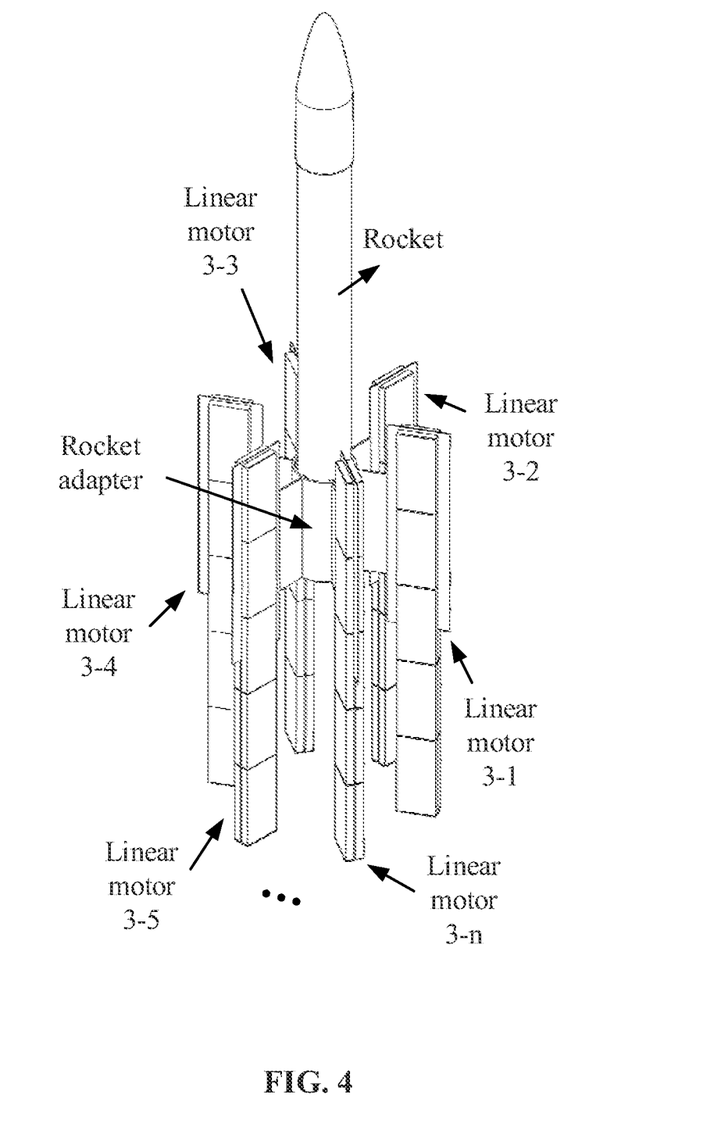
FIG. 4 is a schematic diagram of a circumferential symmetrical arrangement of a linear motor subsystem according to the disclosure.
Figure 5:
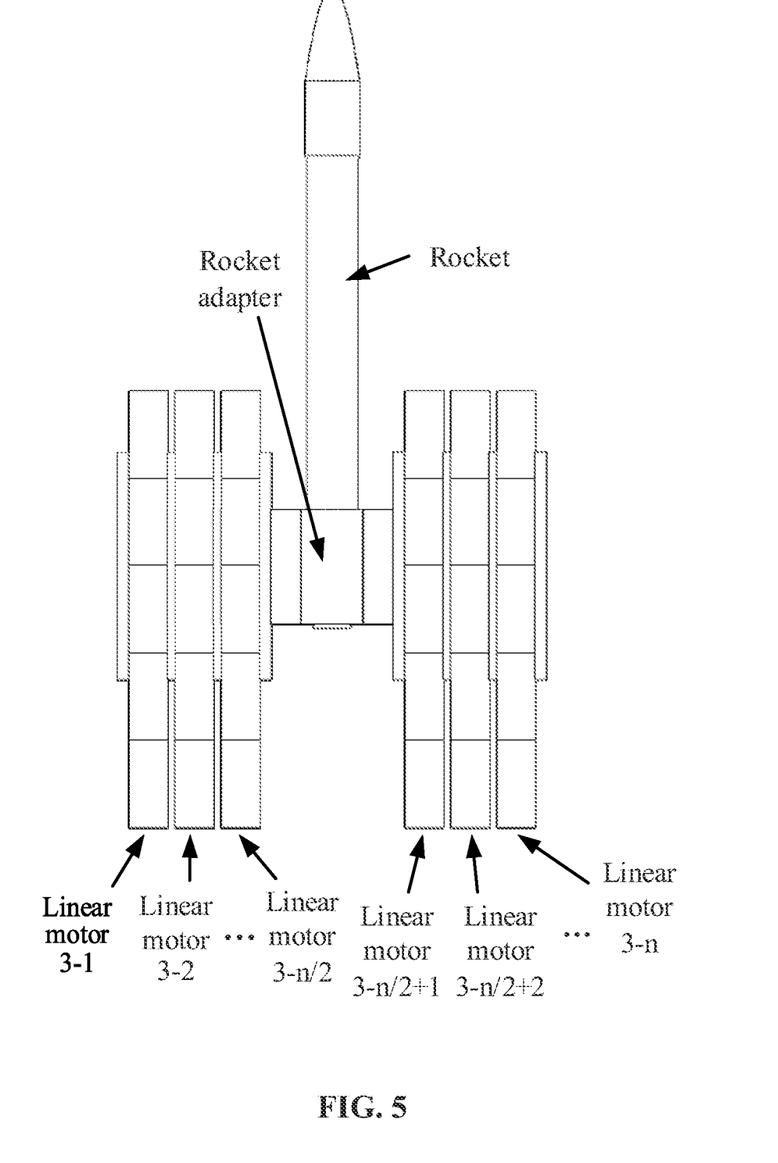
FIG. 5 is a schematic diagram of a radial symmetrical arrangement of a linear motor subsystem according to the disclosure.

In the above solution, the linear motor subsystem 3 comprises n m-phase linear motors and a rocket adapter. The rocket adapter is an interface between the rotors of the linear motors and the rocket, and is configured to match different types of rockets and transfer the electromagnetic forces of the linear motors. Each of the linear motors comprises a stator (primary) and a rotor (secondary) mounted on the stator. The rocket adapter is connected to the rotors of the n linear motors, the rocket is mounted on the rocket adapter, and the stators of the n linear motors form an electromagnetic launching track. As shown in FIG. 4, the stators of the n linear motors are uniformly arranged along a circumferential direction of the rocket adapter, n is an integer greater than or equal to 1, and further, the stators of the n linear motors are uniformly and symmetrically arranged along the circumferential direction of the rocket adapter. Alternatively, as shown in FIG. 5, the stators of the n linear motors are uniformly arranged along a radial direction of the rocket adapter, and further, the stators of the n linear motors are uniformly and symmetrical arranged along the radial direction of the rocket adapter, n being an even number. A length of the stator of the linear motor is a set value, which is about several kilometers. Therefore, the stator of the linear motor adopts a sectional power supply manner. An angle between the stator of each of the linear motors and the horizontal plane is 0-90 degrees, preferably 30 degrees, 60 degrees or 90 degrees. As shown in FIG. 4 and FIG. 5, the angle is 90 degrees. When the system operates, variable-frequency variable-voltage AC electric energy is delivered to the motor stators through the energy conversion subsystem, and the electromagnetic force is generated from the rotors of the motors to drive the rocket adapter to push the rocket along the electromagnetic launching track and accelerate the rocket to a speed of several Mach number.

Figure 6:
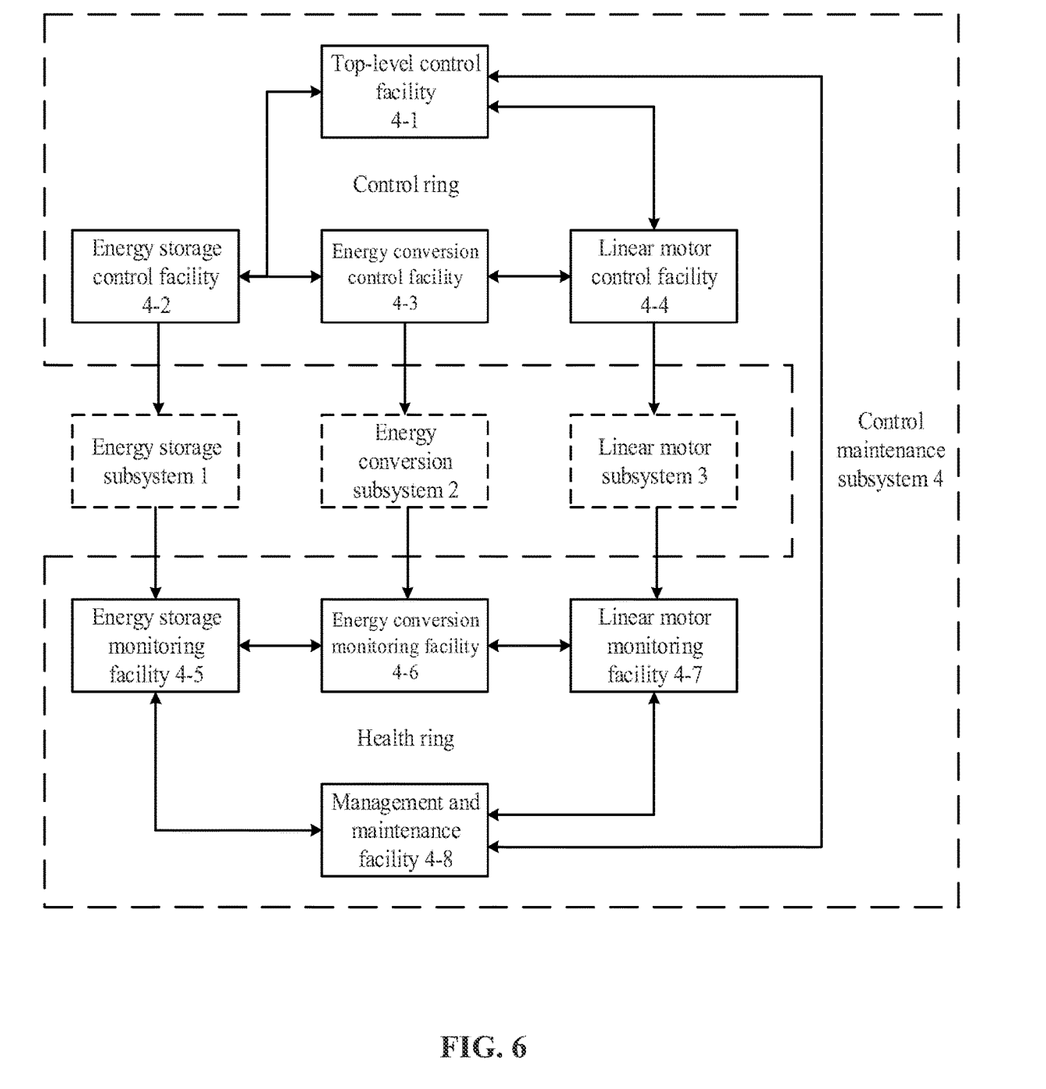
FIG. 6 is a schematic diagram of a control maintenance subsystem according to the disclosure.

In the above solution, as shown in FIG. 6, the control maintenance subsystem 4 comprises a top-level control facility 4-1, an energy storage control facility 4-2, an energy conversion control facility 4-3, a linear motor control facility 4-4, an energy storage monitoring facility 4-5, an energy conversion monitoring facility 4-6, a linear motor monitoring facility 4-7 and a management and maintenance facility 4-8. The top-level control facility 4-1, the energy storage control facility 4-2, the energy conversion control facility 4-3 and the linear motor control facility 4-4 are connected through a control ring. The energy storage monitoring facility 4-5, the energy conversion monitoring facility 4-6, the linear motor monitoring facility 4-7 and the management and maintenance facility 4-8 are connected with each other through a health ring. The top-level control facility 4-1 is additionally separately connected to the management and maintenance facility 4-8. In addition, it is worth noting that some facilities can be combined into one facility. For example, the energy storage monitoring facility and the energy conversion monitoring facility have single functions and low calculation load, and thus can usually be combined into one facility. Similar situations should also fall within the protection scope of the disclosure.

The top-level control facility 4-1 and the management and maintenance facility 4-8 adopt hardware such as industrial personal computers, ruggedized computers, PC104, etc. The control facilities and monitoring facilities of each subsystem adopt hardware such as digital signal processor (DSP), field-programmable gate array (FPGA), programmable logic controller (PLC), PC104, etc. The control ring, the health ring, the top-level control facility and the management and maintenance facility are separately connected through the industrial Ethernet. The control facilities and monitoring facilities of each subsystem are connected with the corresponding subsystem through buses, serial ports, signal lines, etc.

The top-level control facility 4-1 is configured to provide a human-computer interaction control interface and send control instructions respectively to the energy storage control facility 4-2, the energy conversion control facility 4-3 and the linear motor control facility 4-4, to receive, process and send various instructions, and to control the subsystems to complete operations according to predetermined procedures, and has an interlock function which can prevent misoperation. The energy storage control facility 4-2 is configured to implement charging and discharging control on the energy storage subsystem according to the received control instruction. The energy conversion control facility 4-3 is configured to implement energy conversion control on the energy conversion subsystem according to the received control instruction. The linear motor control facility 4-4 is configured to implement real-time control on the rotor motion and control on the sectional power supply of the stators of the linear motors in the linear motor subsystem according to the received control instruction. The energy storage monitoring facility 4-5 is configured to collect operational data (comprising battery voltage, temperature, etc.,) of the energy storage subsystem and upload the operational data to the management and maintenance facility.

The energy conversion monitoring facility 4-6 is configured to collect operational data (comprising current, voltage, temperature, etc.,) of the energy conversion subsystem and upload the operational data to the management and maintenance facility. The linear motor monitoring facility 4-7 is configured to collect operational data (comprising temperature, rotor position, etc.,) of the linear motor subsystem and upload the operational data to the management and maintenance facility. The management and maintenance facility 4-8 is configured to analyze, display, store and query the health status and information of the subsystems (the energy storage subsystem, the energy conversion subsystem and the linear motor subsystem) according to the received data, and provide a maintenance test function, thereby realizing the functions of health management and the like of the devices.

Based on the above space launch system, the disclosure further provides a space launch method through electromagnetic pushing. The method comprises: using the above space launch system, electric energy is converted into an electromagnetic force, and through the electromagnetic force, a rocket is pushed to be accelerated to several Mach number along an electromagnetic launching track to realize the launching of the rocket. Thereby, the primary engine of the current traditional rocket is replaced by the above space launch system.

It will be obvious to those skilled in the art that changes and modifications may be made, and therefore, the aim in the appended claims is to cover all such changes and modifications.

What is claimed is:

1. A space launch system, comprising:
an energy storage subsystem, configured to deliver stored energy to an energy conversion subsystem during rocket propulsion;
the energy conversion subsystem, configured to convert the energy delivered by the energy storage subsystem into AC electric energy and output the AC electric energy to a linear motor subsystem;
the linear motor subsystem, configured to receive the AC electric energy output by the energy conversion subsystem and generate an electromagnetic force that pushes a rocket to be accelerated to a certain speed within a certain distance; and
a control maintenance subsystem, configured to send different control instructions respectively to the energy storage subsystem, the energy conversion subsystem and the linear motor subsystem and control the energy storage subsystem, the energy conversion subsystem and the linear motor subsystem to run according to predetermined programs.

2. The space launch system of claim 1, wherein the energy storage subsystem is further configured to absorb energy from a power supply system and store the energy during the interval of rocket propulsion.

3. The space launch system of claim 2, wherein the energy storage subsystem comprises n×m mutually independent power modules, n is a number of linear motors, and m is a number of phases of each of the linear motors.

4. The space launch system of claim 3, wherein each of the power modules is divided into p power units, and each of the power units is connected to a corresponding inverter unit in an inverter in the energy conversion subsystem.

5. The space launch system of claim 4, wherein each of the power units comprises a battery pack array and a charging cabinet, and the charging cabinet is a charging interface connected between the power supply system and the battery pack array.

6. The space launch system of claim 5, wherein each of the power units further comprises an energy storage switch cabinet, and the energy storage switch cabinet is connected between the battery pack array and the inverter unit.

7. The space launch system of claim 1, wherein the energy conversion subsystem comprises n×m mutually independent inverters, each of the inverters supplies power to one phase of one linear motor, n is a number of linear motors, and m is a number of phases of each of the linear motors.

8. The space launch system of claim 7, wherein each of the inverters comprises k inverter cabinets connected in parallel, and each of the inverter cabinets comprises p inverter units in cascade connection.

9. The space launch system of claim 1, wherein the linear motor subsystem comprises n linear motors and a rocket adapter, each of the linear motors comprises a stator and a rotor mounted on the stator, and the rocket adapter is connected to the rotors of the n linear motors.

10. The space launch system of claim 9, wherein stators of the n linear motors are unifonnly arranged along a circumferential direction of the rocket adapter.

11. The space launch system of claim 9, wherein stators of the n linear motors are unifonnly arranged along a radial direction of the rocket adapter, and n is an even number.

12. The space launch system of claim 9, wherein an angle between the stator of each of the linear motors and a horizontal plane is 0-90 degrees.

13. The space launch system of claim 9, wherein the stator of each of the linear motors adopts a sectional power supply manner.

14. The space launch system of claim 1, wherein the control maintenance subsystem comprises a top-level control facility, an energy storage control facility, an energy conversion control facility, and a linear motor control facility, and the top-level control facility, the energy storage control facility, the energy conversion control facility and the linear motor control facility are connected through a control ring;
   the top-level control facility is configured to provide a human-computer interaction control interface and send control instructions respectively to the energy storage control facility, the energy conversion control facility and the linear motor control facility;
   the energy storage control facility is configured to implement charging and discharging control on the energy storage subsystem according to a first received control instruction;
   the energy conversion control facility is configured to implement energy conversion control on the energy conversion subsystem according to a second received control instruction; and
   the linear motor control facility is configured to implement real-time control on a rotor motion, and control on the sectional power supply of stators of linear motors in the linear motor subsystem according to a third received control instruction.

15. The space launch system of claim 14, wherein the control maintenance subsystem further comprises an energy storage monitoring facility, an energy conversion monitoring facility, a linear motor monitoring facility and a management and maintenance facility, and the energy storage monitoring facility, the energy conversion monitoring facility, the linear motor monitoring facility and the management and maintenance facility are connected with each other through a health ring;
   the energy storage monitoring facility is configured to collect operational data of the energy storage subsystem and upload the operational data to the management and maintenance facility;
   the energy conversion monitoring facility is configured to collect operational data of the energy conversion subsystem and upload the operational data to the management and maintenance facility;
   the linear motor monitoring facility is configured to collect operational data of the linear motor subsystem and upload the operational data to the management and maintenance facility; and
   the management and maintenance facility is configured to analyze, display, store and query a health status and infonnation of the energy storage subsystem, the energy conversion subsystem and the linear motor subsystem according to the received data, and provide a maintenance test function.

16. A space launch method, the method comprising:
converting DC electric energy into AC electric energy;
supplying the AC electric energy to a liner motor subsystem and converting the electric energy into an electromagnetic force through the linear motor subsystem; and
pushing a rocket along an electromagnetic launching track through the electromagnetic force so as to accelerate the rocket to a certain speed;
wherein:
the linear motor subsystem comprises n linear motors and a rocket adapter,
each of the linear motors comprises a stator and a rotor mounted on the stator,
the stators of the n linear motors foini the electromagnetic launching track,
the rocket adapter is connected to the rotors of the n linear motors,
the rocket is mounted on the rocket adapter,
the stators of the n linear motors are unifonnly arranged along a circumferential direction of the rocket adapter; or the stators of the n linear motors are unifonnly arranged along a radial direction of the rocket adapter, and
n is an even number.

17. The method of claim 16, wherein an angle between the stator of each of the linear motors and a horizontal plane is 0-90 degrees.

* * * * *